June 20, 1967 J. T. KLINT 3,326,255

APPARATUS FOR MECHANICALLY CRACKING EGGS

Filed July 23, 1964

INVENTOR
JAN TAVSEN KLINT

BY *Emery, Whittemore, Sandoe & Graham*

ATTORNEY

United States Patent Office 3,326,255
Patented June 20, 1967

3,326,255
APPARATUS FOR MECHANICALLY CRACKING
EGGS
Jan Tavsen Klint, 33 Havnegade, Odense, Denmark
Filed July 23, 1964, Ser. No. 384,632
Claims priority, application Denmark, Aug. 3, 1963,
3,725/63
9 Claims. (Cl. 146—2)

This invention relates to an apparatus for mechanically cracking or breaking eggs.

In practice, after mechanical breaking of the egg, the contents of the egg are moved to a separating device for separation of the yolks and the whites. It is, therefore, of primary importance that the device for mechanical cracking of the egg does not rupture the yolk sac to produce so-called melanges which are inseparable by mechanical means.

It is, therefore, an object of the present invention to provide an improved apparatus for mechanical cracking of eggs which reduces the incidence of rupture of the yolk.

It is known to hold the egg during the breaking operation by means of fingers which grip the egg on both sides of the central plane perpendicular to the long axis of the egg in which plane the breaking is substantially performed, whereby the egg will become slightly flattened towards its ends, and the breaking is carried out by a two-sided or single-sided impact performed by spring-loaded knives. This method has turned out to be rather appropriate for preventing damage to the yolk membrane—whereby the yolk and the white may run together—in response to a penetration of the edges of the cracked shells into the egg, but the percentage of melanges is still comparatively high. It is also known to hold the egg by means of two suction cups applied to the ends of the egg.

According to the invention the egg to be broken is, in a manner known per se, held by a resilient pressure exerted in the direction of the long axis of the egg, and the apparatus is characterised in that the egg is additionally supported on a narrow edge at or about the middle of its length whereupon the egg is pressed over said narrow edge by a relatively light influence exerted substantially diametrically opposite the supporting edge.

It has turned out that this procedure affords an improved result which is assumed to be dependent on the circumstance that the way in which the egg is held, in conjunction with the relatively light single-sided influence on the egg for severing the shell, precludes—unlike the above-mentioned prior art methods—an impact delivered to the egg from producing shock-waves in the yolk which may be regarded as resiliently suspended from two strings, the so-called chalazas, which shock-waves may cause a bursting of the yolk membrane.

Further, this invention relates to an apparatus for performing the above-mentioned method, which apparatus comprises a pair of opposed and substantially axially aligned cup-shaped gripper members for receiving one end each of an egg, and means for moving the two gripper members towards and away from one another, and the apparatus is characterised by a supporting member having a narrow edge for supporting an egg about the middle of its length, and a pressing-down member movable in the direction towards and away from the edge of the supporting member.

The gripper members may be constituted by two cups of a resilient material, and the two gripper members may be biased towards one another by the action of springs. The spring pressure may then, besides being used for exerting the axial pressure on the egg during the breaking operation, be used subsequent to the discharge of the contents of the egg for ejecting the two empty shell halves from the apparatus.

Each gripper member may at one side be provided with a cut-out which affords the possibility of introducing an egg sideways between the two gripper members. An expedient introduction of the eggs into the gripper members, for example by means of a conveyor located adjacent to the apparatus, is hereby made possible.

The supporting member may, according to a feature of the invention, be displaceable towards and away from the gripper members, and the apparatus may have members for cyclically displacing the supporting member. Hereby the supporting member can, subsequent to the breaking of the egg and the discharge of the contents thereof, be used for holding the empty shell until it is to be removed from the gripper members. For holding the empty shell, the supporting member may moreover comprise a pin located behind the narrow edge thereof, which pin projects towards the egg. The pin may terminate in a point substantially aligned with the narrow edge.

According to a feature of the invention the pressing-down member may be constituted by a relatively short knife extending transversally of the axis of the gripper members, which knife is secured to a holder which is arranged for being moved inwardly towards the gripper members substantially solely by its own weight. By suitably adapting the weight of the holder, it is possible to obtain an exact adjustment of the intensity of the pressure exerted by the knife on the egg, which pressure, besides pressing the egg down over the narrow supporting edge, moreover produces a breaking indication or line located diametrically opposite said edge, which indication promotes the formation of a comparatively regular line of fracture all around the egg.

The two gripper members may advantageously be mounted in a known manner, on one each of two discs which are rotatable synchronously and in opposite directions on mutually parallel axes, whereby the movement of the gripper members towards each other subsequent to the introduction of an egg for holding the same, and away from each other subsequent to the breaking, is secured solely by the rotation of the discs, i.e., without using separate actuating members.

Between the two discs there may be provided a guide member comprising guide faces which are shaped for determining the position of the pressing-down members when they are moved towards each other during the rotation of the discs. Hereby it is ensured that the pressure exerted by the said members on the egg takes place exactly opposite the knife-like narrow edges of the supporting members.

For controlling the pressing-down members, the apparatus may comprise stationary cam members which are concentrical with the two discs and arranged for co-operating with cam followers rigidly secured to the pressing-down members, and these cam members may be shaped so that in the area where the discs meet, the two co-operating pressing-down members are moved forwardly towards each other and downwardly towards the egg held by the two associated gripper members in a positively controlled manner.

The invention will be explained in more detail below with reference to the accompanying diagrammatical drawings which show the parts, necessary for understanding the invention, of an embodiment of the present invention.

Figure 1:
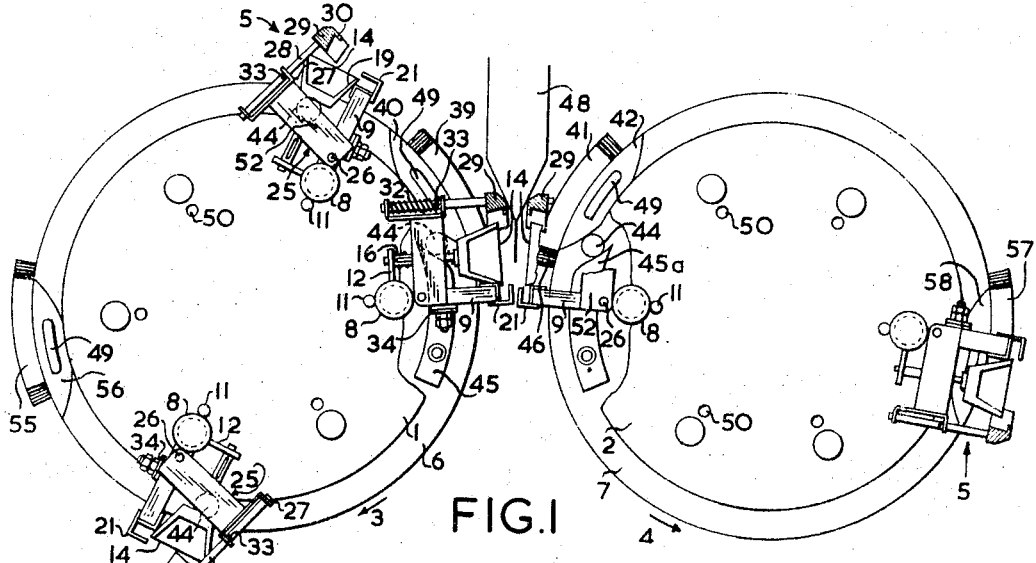
FIG. 1 is an elevation of the two rotary discs, provided with gripper units, of the apparatus, several details being omitted for the sake of clarity.

FIG. 1 shows two circular discs 1 and 2 which are journalled in a machine frame, not shown, and connected to driving means which are arranged for rotating the discs in the directions of the arrows 3 and 4 and at the same rate of revolution. Each of the discs 1 and 2 carries a number of gripper units, in the example shown six, which generally are designated by 5. Adjacent to each of the discs 1 and 2 and coaxially with the respective disc, there is provided a stationary disc 6 and 7, respectively, having cam means for the movement, described below, of certain components in the gripper units 5 during the rotation of the discs 1 and 2.

Figure 2:
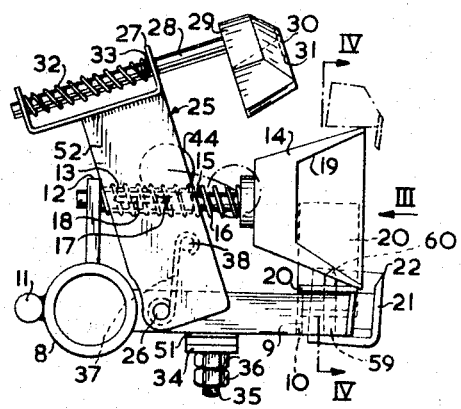
FIG. 2 is an elevation, partially in section, of one of the gripper units shown in FIG. 1.
Figure 3:
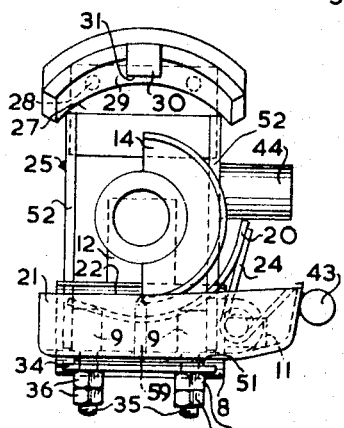
FIG. 3 is a view of the unit shown in FIG. 2, in the direction of the arrow III in FIG. 2.
Figure 4:
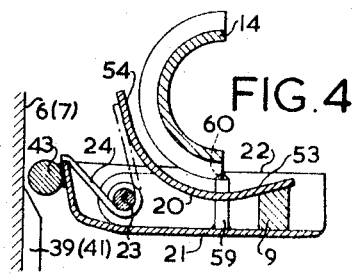
FIG. 4 is a section taken on line IV—IV in FIG. 2.

Each gripper unit 5 which is shown in more detail in FIGS. 2–4, comprises a frame secured to the disc concerned, 1 or 2, and consisting of a hub 8, two webs 9 secured to said hub and parallel to the disc and a cross-member 10 which inter-connects the front ends of the webs 9. A guide pin 11 secured to the hub 8 extends into a pilot hole 50 in the disc 1 or 2, respectively, to locate the frame of the gripper unit with respect to the disc.

To the hub 8 there is secured an upstanding spoke member 12 substantially perpendicular to the webs 9, and to member 12 there is secured a sleeve 13 which is substantially parallel to the webs 9. The bottom of a cup-shaped gripper member 14 made of resilient material, for example rubber, is secured to a pin 15 which is displaceably guided in the sleeve 13. A compressing spring 16 between the spoke member 12 and the gripper member 14 urges the latter forwardly towards the cross-member 10, and the travel of the gripper member is limited by a guide pin 17 secured to the pin 15 and engaging an elongated slot 18 in the sleeve 13.

At one side of the front cup-shaped portion of each gripper member 14 there is provided a cut-out 19, the function of which will be explained below.

Beneath the gripper member 14 a gripper saddle 20 is secured to the webs 9 and between the webs said saddle has a concave upwardly facing supporting face 53 which continues into an upwardly facing portion 54 at the side of the gripper member 14 opposite the cut-out 19. In front of the saddle 20 there is provided a lower knife 21 having an upwardly facing cutting edge 22. The knife 21 is pivotal on a pin 23 parallel to the webs 9 and biased by a torsion spring 24 which tends to raise the portion of the knife 21 which carries the cutting edge 22. The knife 21 is of angular cross-sectional shape so that the said raising is limited by the engagement of the knife against the underside of one of the webs 9, see FIG. 2.

In the horizontal portion of the lower knife 21 there is, for example by welding, secured a pin 59 which is parallel to the vertical portion of the knife and which extends up through a hole in the supporting face 53 of the saddle 20. The pin 59 terminates in a point 60 substantially level with the cutting edge 22 of the knife.

A generally U-shaped stirrup 25 is pivotally supported in the frame of the gripper unit 5 by means of a pin 26 extending through the two webs 9 in parallel to the edge 22 of the knife 21. The stirrup 25 consists of two parallel side members 52 which project past the rearmost end of the gripper member 14 at either side thereof, and of a transverasl U-shaped plate 27 secured to the side-members 52, in which plate two pins 28 parallel to the vertical longitudinal centre plane of the gripper member 14 are displaceable. At their front ends the pins 28 are secured to a transversal block 29 which extends over the gripper member 14, and to which a downwardly facing upper knife 30 is secured. The knife 30 is substantially narrower than the lower knife 21, see FIG. 3, and it is arranged with its downwardly facing edge 31 centrally above the axis of the gripper member 14. The block 29 is urged forwardly towards the opening of the gripper member 14 by two compression springs 32 which are each disposed between the rearmost upwardly facing flap of the plate 27 and a pin 33 extending transversally through the pin 28, said pin 33 operating at the same time as a stop for the forward motion of the block 29, see FIG. 2.

The swinging of the stirrup 25 and the block 29 connected thereto is restricted in the direction towards the front end of the gripper member 14 by a stop bar 34 which cooperates with the side members 52 of the stirrup 25. The position of the bar 34 along two studs 35 screwed into the webs 9 can be adjusted by means of detachable shims 51. The bar 34 is secured to the webs 9 by means of nuts 36. The stirrup 25 is spring-loaded in the direction towards the stop bar 34 by a torsion spring 37 located between the pivot 26 and a spring pin 38 secured to a side member 52 of the stirrup 25.

For controlling the movements of the two knives 29 and 30 during rotation of the disc, 1 and 2, respectively, to which the gripper unit 5 is secured, there are provided two stationary cam blocks 39 and 40 on the disc 6 coaxial with the disc 1 and two similar cam blocks 41 and 42 on the disc 7 coaxial with the disc 2. The cam block 39 or 41, respectively, which guides the lower knife 21 cooperates with a cam follower pin 43 secured to said knife, see FIG. 4, whilst the other cam block 40 or 42 respectively, cooperates with a cam follower pin 44 secured to the stirrup 25, see FIG. 3. For guiding the pin 44 there is furthermore, in the area where the two discs 1 and 2 are closest to one another, provided two stationary cam blocks 45 and 45a, one being the mirror image of the other, see FIG. 1.

When during the rotation of the discs 1 and 2 a gripper unit 5 has passed the position shown at the top of the disc 1 in FIG. 1, the pins 43 and 44 engage the associated cam blocks, in this case the blocks 39 and 40. Hereby the lower knife 21 is, against the action of the spring 24, lowered with respect to the lower edge of the gripper member 14, whilst the holder 29 with the upper knife 30 is raised with respect to the upper edge of the gripper member 14. By the continued rotation of the discs 1 and 2 in the direction of the arrows 3 and 4, the pin 43 will first, shortly before the two opposed and cooperating gripper units 5, one on each disc, have reached the position shown at the middle of FIG. 1, move down the inclined outlet face 46 of the guide block 39, whereby the spring 24 will raise the knife 21 to the position shown in FIGS. 2–4.

Prior to this raising of the lower knife 21, an egg has been advanced to the two cooperating gripper units by means of a conveyor not shown extending transversally in relation to the plane of the discs 1 and 2, the movement of said conveyor being synchonized with the rotation of the discs. The egg rolls from the conveyor directly in through the cut-outs 19 of the gripper members 14 and it is first caught by the upwardly facing supporting face 53 of the gripper saddle 20. When the two gripper members are approached to one another by the rotation of the discs, the ends of the egg will engage the innerside of the cup-shaped gripper members 14 which consequently are displaced rearwardly against the action of the springs 16. Thus, the egg is held by an axial pressure exerted by the springs 16 of the two cooperating gripper members 14 and, when the two lower knives 21 have been raised as above explained, it is furthermore supported by the cutting edges 22 of said knives.

Hereafter, the pin 44 is guided by the two opposed cam faces on the blocks 40 and 45, or 42 and 45a, as the case may be, whereby the stirrups 25 of the two gripper units are moved positively forwardly and downwardly against the upper side of the egg. When the front faces of the two blocks 29 meet one another, their knives 30 are centered accurately with respect to the lower knives 21 by means of a guide bar 48 disposed between the two discs 1 and 2 and having, as shown, two converging guide faces for the blocks. Thus, the egg is influenced by the upper knives 30 diametrically opposite the place where it is supported by the lower knives 21, and by this influence the egg is pressed downwardly over the two adjacently disposed cutting edges 22 of the lower knives which thereby penetrate into the egg and sever the egg shell.

By the continued rotation of the two discs 1 and 2 the egg is divided into two parts, and the contents thereof run down along a chute, not shown, to members which, as known in the art, effect a subsequent separation of the yolk and the white. During this movement the two halves of the egg are held in one gripper unit each, the lower knife 21 being still in the raised position held by the spring 24, whilst the block with the upper knife is kept in position both by its own weight and by the spring 37 which in the lower part of the movement of the gripper unit counteracts the centrifugal force exerted on the block. Below the two rotary discs there may be provided air nozzles which blow possible remainders of egg white out of the shells. The pin 59 with the point 60 which by the severing of the egg has penetrated the shell simultaneously with the cutting edge 22 of the knife 21 serves for further holding the egg shell during the said rotation of the two discs.

By the further rotation of the discs 1 and 2 the cam follower pins 43 and 44 are actuated by two cam blocks 55 and 56, respectively, on the disc 6, and 57 and 58, respectively on the disc 7, see FIG. 1. Hereby the lower knives 21 and the stirrups 25 with the upper knives 30 are again moved away from each other to release the egg shells so that the springs 16 may advance the respective gripper members 14 and eject the empty shells which may be removed from the machine along discharge chutes adapted to this purpose. Subsequent to the ejection of the shells, the components of the gripper units are again moved towards each other when the associated cam follower pins are disengaged from the blocks 55–58, and said components are again moved away from each other ready for the reception of another egg, when the rotation of the discs 1 and 2 brings the pins in engagement with the cam blocks 39–42.

The cam blocks 40, 42, 56, and 58 for controlling the movement of the blocks 29 carrying the upper knives 30 have elongated holes 49 which make possible a fine adjustment of the location of the blocks, as it is especially important to ensure that the two upper knives are moved down towards the egg to initiate the breaking of the shells at the moment when the two lower knives meet. The blocks 39, 41, 55, 57 cooperating with the lower knives may likewise be adjustable or may alternatively be stationary.

The adjustability of the stop bar 34 for the swinging of the stirrup 25 in the direction towards the egg by means of the detachable shims 51 allows an adjustment within certain limits according to the size of the eggs handled, without replacement of the gripper units. However, it will be appreciated that for the accurate operation of the machine it will be necessary that the eggs have been sorted according to their size in advance.

I claim:
1. Apparatus for mechanically cracking eggs, comprising two discs (1, 2), means for rotatably supporting said discs on substantially horizontal and parallel axes, a plurality of egg gripper units (5) mounted in spaced angular relationship at the periphery of each disc (1, 2), means for rotating said discs synchronously and in opposite directions whereby cooperating pairs of gripper units are successively carried in a downward rotational movement towards an aligned position and then away from one another, each of said gripper units (5) comprising an outwardly open gripper member (14) for gripping one end of an egg, means (16) resiliently biasing said gripper member in a radially outward direction, opposed first and second knife members (21, 25) each having a knife edge (22, 31) extending substantially parallel to the rotational axis of the associated disc (1, 2) upon which the gripper unit (5) is mounted, means (43, 44) on said gripper unit for moving said first and second knife members in succession towards the axis of said gripper member (14), and stationary cam means (39, 41), (40, 42, 45, 45a) associated with said discs for controlling said successive movements of said first and sesond knife members.

2. Apparatus as claimed in claim 1, wherein said first knife member (21) is pivotally supported on an axis (23) perpendicular to the rotational axis of the associated disc (1, 2).

3. Apparatus as claimed in claim 2, wherein said first knife member (21) is positioned so that in said aligned gripper unit position, the knife edges (22) of the cooperating gripper units are located in closely spaced relation below the common axis of the aligned gripper members (14).

4. Apparatus as claimed in claim 3, wherein spring means (24) are provided for resiliently biasing said first knife member (21) towards the gripper member axis, and said cam means (39, 41) are arranged for pivoting said knife member against the action of said spring means (24).

5. Apparatus as claimed in claim 3, wherein said first knife member (21) is supported by a frame (9, 10) to which there is secured, inwardly of said knife member, a saddle member (20) having an egg-supporting face (53) located below said gripper member (14).

6. Apparatus as claimed in claim 1, wherein said sceond knife member comprises a frame (25) pivotally supported by said gripper unit (5) on a pivot axis parallel to the associated knife edge (31).

7. Apparatus as claimed in claim 6 in which said knife edge (31) is mounted on a holder (28–30) reciprocably guided by said frame (25), and spring means (32) are provided between said frame (25) and said holder (28–30) for urging said holder in a radially outwardly direction.

8. Apparatus as claimed in claim 7 in which the means (44) for moving said second knife member towards the axis of said gripper member (14) is a follower pin mounted on said frame (25) and cooperating with opposed stationary cam means (40, 45 or 42, 45a) defining between them a cam track wherein said pin (44) is positively guided in the region of said aligned position of each cooperating pair of gripper units (5).

9. Apparatus as claimed in claim 8 comprising a stationary guide member (48) arranged between said discs (1, 2) and above the nip therebetween for urging each of said holders (28–30) radially inward against said spring means (32).

References Cited
UNITED STATES PATENTS

| | | | |
|---|---|---|---|
| 894,106 | 7/1908 | Beel | 146—2 |
| 1,945,788 | 2/1934 | Pilley | 146—2 |
| 2,090,963 | 8/1937 | Reese | 146—2 |
| 2,706,507 | 4/1955 | Bartell | 146—2 |
| 2,771,926 | 11/1956 | Willsey | 146—2 |
| 3,133,569 | 5/1964 | Shelton et al. | 146—2 |

WILLIAM W. DYER, JR., *Primary Examiner.*
JAMES M. MEISTER, *Examiner.*